(12) United States Patent
Matsuura

(10) Patent No.: US 11,510,128 B2
(45) Date of Patent: Nov. 22, 2022

(54) PATH SELECTION APPARATUS, PATH SELECTION METHOD AND PROGRAM

(71) Applicant: NIPPON TELEGRAPH AND TELEPHONE CORPORATION, Tokyo (JP)

(72) Inventor: Hiroshi Matsuura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 60 days.

(21) Appl. No.: 17/259,706

(22) PCT Filed: Jul. 18, 2019

(86) PCT No.: PCT/JP2019/028346
§ 371 (c)(1),
(2) Date: Jan. 12, 2021

(87) PCT Pub. No.: WO2020/022193
PCT Pub. Date: Jan. 30, 2020

(65) Prior Publication Data
US 2021/0235358 A1 Jul. 29, 2021

(30) Foreign Application Priority Data
Jul. 24, 2018 (JP) .............................. JP2018-138840

(51) Int. Cl.
*H04W 40/02* (2009.01)
*H04W 84/18* (2009.01)
(Continued)

(52) U.S. Cl.
CPC ............. *H04W 40/02* (2013.01); *H04W 4/38* (2018.02); *H04W 84/18* (2013.01); *H04W 88/04* (2013.01)

(58) Field of Classification Search
CPC ....... H04W 40/02; H04W 4/38; H04W 84/18; H04W 88/04
See application file for complete search history.

(56) References Cited

U.S. PATENT DOCUMENTS

2009/0016239 A1*  1/2009  Honjo ................... H04W 28/16
                                                      370/253
2010/0310258 A1* 12/2010  Wang .................... H04W 40/02
                                                      398/115
(Continued)

FOREIGN PATENT DOCUMENTS

JP       2013-038534      2/2013
JP       2018-023013      2/2018

OTHER PUBLICATIONS

Matsuura et al., "Optimization Challenge: Maximizing Lifetime of a Data-Gathering Sensor Tree," 2016 IEICE Communication Society Conference, Sep. 20, 2016, 2 pages (Year: 2016).*

(Continued)

*Primary Examiner* — Kent Krueger
(74) *Attorney, Agent, or Firm* — IPUSA, PLLC

(57) ABSTRACT

A path selection apparatus in a sensor tree includes a node moving unit that selects a first node in the sensor tree, and moves a second node to under a third node in the sensor tree if the total number of packets transmitted and received in the sensor tree is reduced as a result of the second node being moved to under the third node, the first node having a child node under the first node, the second node being located under a subtree of which a vertex is the first node, the third node not belonging to the subtree. If nodes under the subtree of which the vertex is the first node do not include a node that reduces the total number of packets as a result of being moved, the node moving unit moves a node that is included (Continued)

in the nodes under the subtree and does not change the total number of packets, to under the third node.

9 Claims, 16 Drawing Sheets

(51) Int. Cl.
*H04W 88/04* (2009.01)
*H04W 4/38* (2018.01)

(56) References Cited

U.S. PATENT DOCUMENTS

2012/0063387 A1* 3/2012 Chen .................. H04L 45/02
370/328

2013/0258985 A1* 10/2013 Keshavarzian ... H04W 52/0209
370/329
2014/0254433 A1 9/2014 Abe et al.

OTHER PUBLICATIONS

Tim Winter et al., "RPL: IPv6 Routing Protocol for Low-power and Lossy Networks", IETF, Mar. 2012.
Tung-Wei Kuo et al., "On the Construction of Data Aggregation Tree with Minimum Energy Cost in Wireless Sensor Networks: NP-Completeness and Approximation Algorithms", IEEE Transactions on Computers, pp. 3109-3121, 2016, vol. 65, issue 10.
Samir Khuller et al., "Balancing minimum spanning trees and shortest-path trees", Algorithmica, pp. 305-321, 1995,vol. 14.
Hiroshi Matsuura, "Switching-based Data Aggregation Tree Optimization on Total Energy Consumption", IEICE General Conference, Mar. 2018.

* cited by examiner

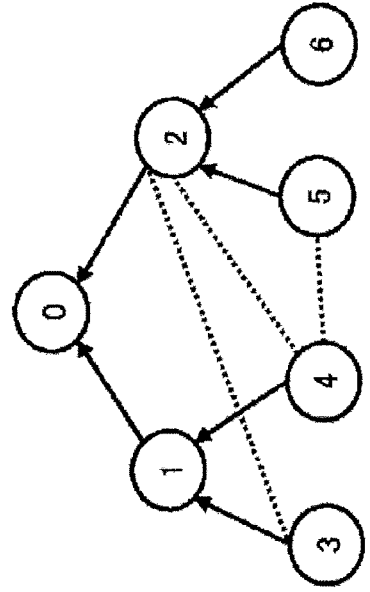
(1) ADJACENCY RELATIONSHIPS BETWEEN SENSORS
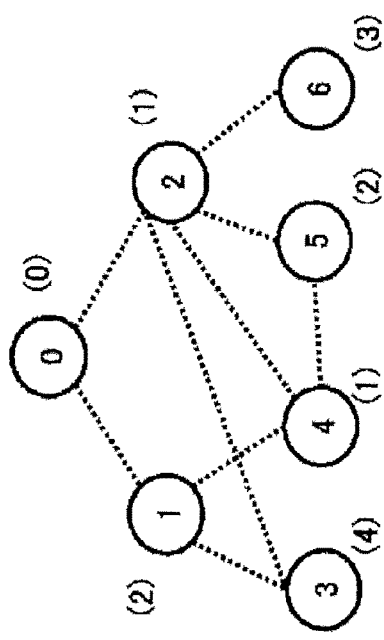
(3) SHORTEST PATH TREE EXAMPLE 2
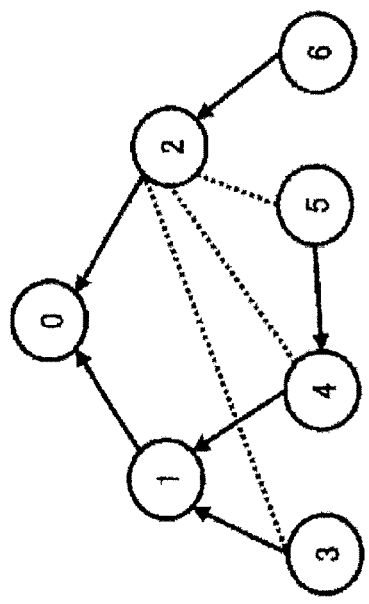
(2) SHORTEST PATH TREE EXAMPLE 1
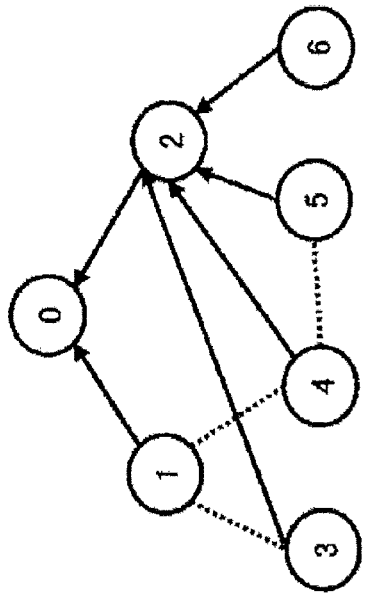
(4) NON-SHORTEST PATH TREE EXAMPLE
Fig. 2

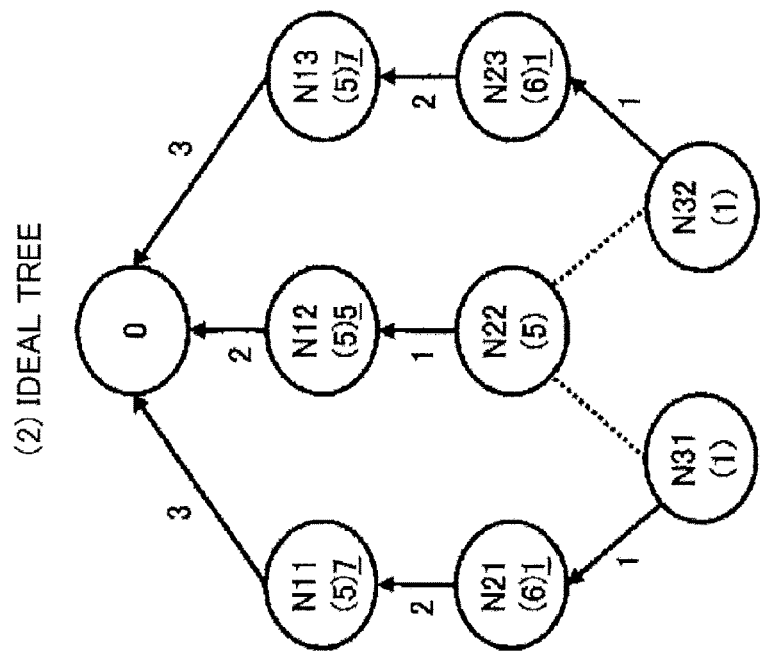
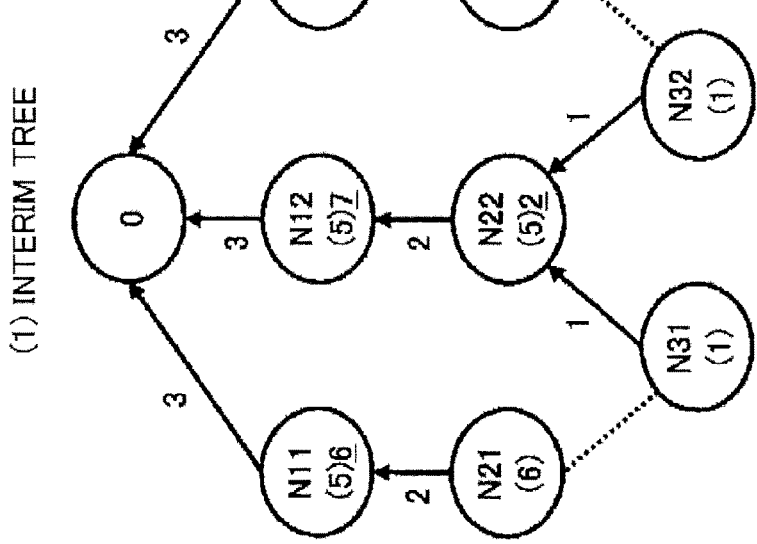
Fig. 7

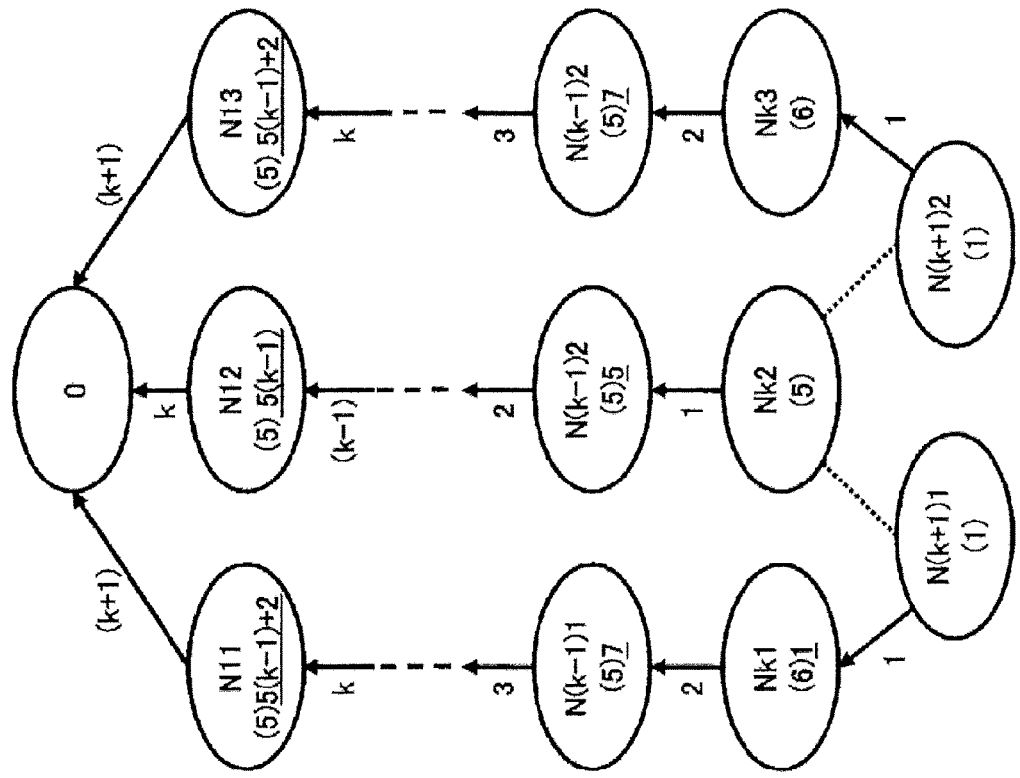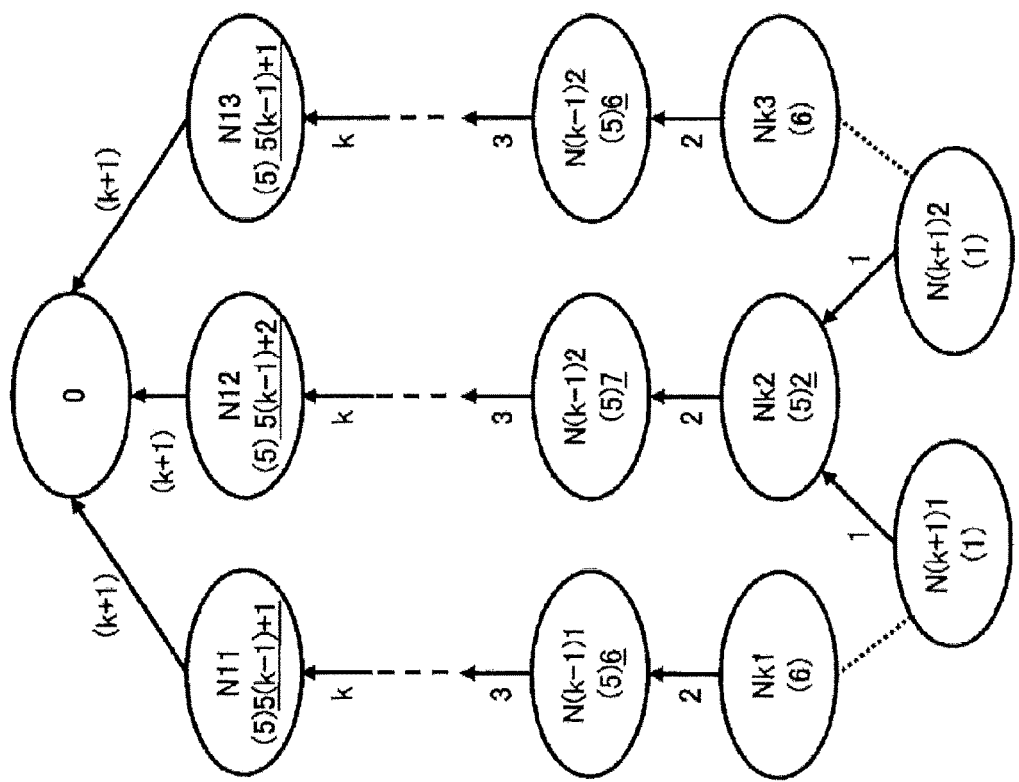
Fig. 8

PATH SELECTION APPARATUS, PATH SELECTION METHOD AND PROGRAM

TECHNICAL FIELD

The Present invention relates to a path selection apparatus, a path selection method, and a program for selecting a path in a sensor tree that is constituted by a plurality of nodes including a plurality of sensor nodes.

BACKGROUND ART

The RPL (Routing Protocol for Low-power and Lossy Networks) protocol is standardized as a technology that enables to arrange sensors at predetermined places, measure humidity, temperature, concentration of gas, and the like at the target places by using sensor nodes, collect sensor reports from the sensor nodes by using a data collection tree, and give a notification from a root sensor node to a base station to perform analysis, or enables to periodically collect information from gas meters, electricity meters, and the like by using a data collection tree (see NPL 1, for example). A data collection tree is a set of sensor nodes that are configured in a tree-like form and relay nodes that are located between sensor nodes and function to relay sensor reports, and the data collection tree is also called a sensor tree.

In each collection cycle, each sensor node on a data collection tree transmits a required number of sensor reports from the sensor to an upper sensor node on the tree, while collecting the sensor reports into packets together with sensor reports from all sensor nodes under the node on the tree. There is an upper limit (data aggregation rate: S) for the number of sensor reports that can be stored in a packet, and therefore the number of packets transmitted by each sensor node/relay node is determined from the number of sensor reports that need to be transmitted by the sensor node/relay node and S.

Also, energy consumption E (i) of a sensor node/relay node i (node i) in one data collection cycle can be expressed by the following Expression 1.

$$E(i) = E_{Tx} \times T_N(i) E_{Rx} \times R_N(i) \quad \text{(Expression 1)}$$

In Expression 1, $E_{TX}$ represents an amount of energy required to transmit one sensor packet, $E_{Rx}$ represents an amount of energy required to receive one sensor packet, $T_N(i)$ represents the number of packets that need to be transmitted by the node i in one data collection cycle, and $R_N(i)$ represents the number of packets that need to be received by the node i in one data collection cycle. $T_N(i)$ is expressed by the following Expressions 2 and 3 in which d(i) represents the number of sensor reports that are created by the node i in one data collection cycle and d(below_i) represents the total number of sensor reports that the node i transfers from all lower nodes on the tree.

$$T_N(i) = (d(\text{below\_i}) + d(i))/S, \text{ (in cases in which } (d(\text{below\_i}) + d(i)) \% S = 0) \quad \text{(Expression 2)}$$

$$T_N(i) = (d(\text{below\_i}) + d(i))/S + 1, \text{ (in cases in which } (d(\text{below\_i}) + d(i)) \% S \neq 0) \quad \text{(Expression 3)}$$

In Expressions 2 and 3, "/" indicates quotient of division, and "%" indicates remainder of division. From Expressions 2 and 3, it can be understood that when the remainder is not zero, there is room in a transmitted and received packet. Therefore, reducing room in packets at each link is considered effective means for reducing the number of packets.

The total energy consumption $E_{tree}$ of the entire tree T in one data collection cycle is obtained by adding energy consumption of all tree nodes in one data collection cycle, and accordingly, can be expressed by the following Expression 4.

$$E_{tree} = \Sigma_{i \in T} E(i) \quad \text{(Expression 4)}$$

In particular, in the case of sensors that are installed indoors, power used by each sensor is supplied from an AC adapter, and in such a case, the total power supplied to the sensors needs to be reduced as far as possible to save power. Therefore, a method for minimizing $E_{tree}$ expressed by Expression 4 has been considered (see NPL 2). NPL 2 deals with two problems. One problem is the MECAT (Minimum Energy Cost Aggregation Tree) problem, which is a minimization problem of the total energy used by tree nodes (nodes on a tree) for a WSN (Wireless Sensor Network) that does not include relay nodes that do not create sensor reports and are used to transfer only sensor reports of lower sensor nodes on the tree. The other problem is the MECAT-RN (MECAT with Relay Node) problem, which is a minimization problem of the total energy used by all tree nodes including relay nodes in a WSN.

In the above Expression 1, $E_{Tx}$ and $E_{Rx}$ are fixed values, and therefore, in both of a WSN that does not include relay nodes and a WSN that includes relay nodes, minimizing the total number of packets that are transmitted and received on all links (adjacency relationships used by tree nodes to transfer sensor reports) on the tree is equivalent to the MECAT problem and the MECAT-RN problem. That is, the MECAT problem and the MECAT-RN problem are equivalent to the following Expression 5, and equivalent to Expression 6 since $E_{Tx}$ and $E_{Rx}$ are fixed values.

[Formula 1]

$$\min_{T \in T(G)} \sum_{e \in E_T} (E_{Tx} + E_{Rx}) \left\lceil \frac{z(e)}{S} \right\rceil \quad \text{(Expression 5)}$$

[Formula 2]

$$\min_{T \in T(G)} \sum_{e \in E_T} \left\lceil \frac{z(e)}{S} \right\rceil \quad \text{(Expression 6)}$$

In Expressions 5 and 6, G represents the WSN and T (G) represents a tree set on G. Also, e represents a link on the tree and z(e) represents the number of sensor reports transmitted on e in one data collection cycle, and therefore, when i denotes a transmission node on e, z(e)−d(below_i)+d(i).

FIG. 1 shows an example of the numbers of packets with respect to links on a data collection tree. Here, the data aggregation rate S is 5. Also, a node 0 represents a root node, nodes that are shown by ○ and denoted with names starting from N represent sensor nodes, and a node shown by ▲ represents a relay node. A numeral shown in parentheses in each node indicates the number d(i) of sensor reports created by the node, and an underlined numeral shown beside the numeral indicates d(below_i). Solid line arrows between nodes show links on the tree, and directions of the arrows indicate directions in which packets are transmitted. Numerals shown beside the links on the tree indicate the numbers of packets transmitted on the respective links in one data collection cycle.

NPL 2 proves that a randomly created shortest path tree is effective for the MECAT problem and the shortest path tree reduces the total energy consumption of sensors to be not larger than twice the optimum solution (the minimum value of the total energy consumption of all tree nodes).

Here, the shortest path tree means a tree in which each sensor node on the tree has the minimum hop count from a root node. For example, (1) in FIG. 2 shows adjacency relationships between nodes on a WSN by using dotted lines. Here, an adjacency relationship means a relationship that enables communication (connection), for example, a relationship in which one node is located within a range in which radio signals (e.g., RSSI (Received Signal Strength Indicator)) from another node can reach. Note that a numeral shown in parentheses beside each node indicates the number of sensor reports that are reported by the node in one data collection cycle. Examples of sensor trees created on this WSN are shown in (2) to (4).

(2) is one example of the shortest path tree in which hierarchical relationships (links) between nodes on the tree are shown using solid line arrows, and sensor reports are transmitted using the hierarchical relationships along the tree to a node 0, which is a root node. As shown in (2), each node on the tree is located on a path for which the hop count to the node 0 is minimum. (3) is another example of the shortest path tree, and it can be understood that there are a plurality of shortest path trees other than (2). (4) shows an example of a tree that is not the shortest path tree. In this example, the hop count from a node 5 to the node 0 is three, but the minimum hop count is two, and therefore this is not the shortest path tree.

NPL 2 proves that in the case of the shortest path tree, the total energy of the sensor tree expressed by Expression 6 can be reduced to be not larger than twice the optimum solution (minimum energy), irrespective of the number of sensor reports reported by each node.

Also, NPL 2 shows that it is effective to apply the LAST (Light Approximate Shortest-path Tree) algorithm (see NPL 3) to the MECAT-RN problem. The LAST algorithm includes parameters $\alpha$ and $\beta$, and in a tree that is created by applying ($\alpha$, $\beta$)—LAST, it is assured that the distance from a root node to each node on the tree is not longer than $\alpha$ times the shortest path, and the cost (the sum of tree link costs) of the entire tree is not larger than $\beta$ times the tree cost of an MST (Minimum Spanning Tree). NPL2 proves that if a tree is created by applying (3,2)—LAST on a WSN that includes relay nodes, the total energy consumption can be reduced to be not larger than 7 times the optimum solution (minimum energy tree).

FIGS. 3 and 4 show examples of application of (3,2)— LAST to the MECAT-RN problem. FIG. 3(1) shows a WSN that includes relay nodes (RN: ▲). Relay nodes are characterized in that the relay nodes function to relay transmission between sensor nodes that do not have an adjacency relationship therebetween and the relay nodes do not transmit sensor reports of their own to the root node 0. First, logical links between sensor nodes that do not include the relay nodes are created in (2). The logical links indicate connection between sensor nodes excluding the relay nodes. At this time, each logical link cost is the minimum hop count including relay nodes between sensor nodes. In (2), the logical link cost of each logical link is indicated by a numeral shown beside the logical link, and links for which numerals are not shown all have a link cost of three. (3) and (4) show application of the (3, 2)—LAST algorithm, and first in (3), an MST is created in the network shown in (2). The MST is a tree for which the sum of logical link costs constituting a tree spanning all nodes (sensor nodes 0 to 5) is minimum, and the Prim's algorithm and the like is used.

In (4), which is characteristic of (3,2)—LAST, the shortest path cost is compared at each node on the MST, and if the following condition: a path on the MST>(3× shortest path from the root node) is satisfied, the path on the MST is replaced with the shortest path from the root node. In this example, it can be found that paths to a node 5 and a node 2 on the MST are replaced with the shortest paths. (5) shows a result obtained by unfolding a tree that is created as a result of the (3,2)—LAST algorithm being applied in (4), together with relay nodes. If there are a plurality of paths from the node 0 to a node in the result shown in (5), the shortest path of the plurality of paths is selected, but in the example shown in FIG. 3, a path is uniquely determined for each node.

FIG. 4 shows a method for dealing with a case in which there are a plurality of paths for a single node in a result obtained through decomposition into relay nodes. In this example as well, logical links between sensor nodes that do not include relay nodes are created in (2). In (2), the logical link cost of each logical link is indicated by a numeral shown beside the logical link, and links for which numerals are not shown all have a link cost of two. An MST is created in (3) based on the logical links set in (2). In this example, there is no node that satisfies the condition: a path on the MST> (3×shortest path from the root node), and therefore the result shown in (3) is unfolded as is together with relay nodes, in (4). However, it can be found that nodes 1 to 4 each have two paths to the root node 0. In this case, the shortest path is selected in order starting from the node 1. The shortest path from the node 1 is a node that passes through a relay node (r1), and therefore a link between the node 1 and a node r2 is deleted. As a result, a path to the node 0 is uniquely determined for each node and a final tree shown in (5) is created.

CITATION LIST

Non Patent Literature

[NPL 1] T. Winter, et al., "RPL: IPv6 Routing Protocol for Low-power and Lossy Networks", RFC6550, IETF, March 2012.

[NPL 2] Tung-Wei Kuo, Kate Ching-Ju Lin, and Ming-Jer Tsai, "On the Construction of Data Aggregation Tree with Minimum Energy Cost in Wireless Sensor Networks: NP-Completeness and Approximation Algorithms", IEEE Transactions on Computers, vol. 65, issue 10, pp. 3109-3121, 2016.

[NPL 3] S. Khuller, B. Raghavachari, and N. Young, "Balancing minimum spanning trees and shortest-path trees", Algorithmica, vol. 14, pp. 305-321, 1995.

[NPL 4] H. Matsuura, "Switching-based Data Aggregation Tree Optimization on Total Energy Consumption", IEICE General Conference, March 2018.

SUMMARY OF THE INVENTION

Technical Problem

It is proved in NPL 2 that the upper limit of the energy consumption is not larger than twice the optimum solution in the MECAT problem and not larger than 7 times the optimum solution in the MECAT-RN problem, but conversely, there is concern that the maximum energy consumption may be increased up to twice in the MECAT problem and up to 7 times in the MECAT-RN problem. As a method for reducing such an increase in the energy consumption from the optimum solution, a method described in NPL 4 is proposed. NPL 4 makes it possible to reduce the energy consumption of nodes on a sensor tree by moving nodes on the sensor tree to change the configuration of the sensor tree.

FIG. 5 shows a flow for moving nodes on a sensor tree that is proposed in a conventional method (NPL 4). After an initial tree is created STEP 1, in STEP 1, in STEP 2, a node that has not yet been selected in a loop between STEP 2 and STEP 5 after creation of the tree in STEP 1 is selected in the initial tree, as a vertex node of a subtree. Thereafter, whether or not a node under the selected vertex node of the subtree can be moved is determined in STEP 4. If there is a node that can be moved, the routine returns to STEP 1, a post-movement tree is created by moving the node in STEP 1, and processing in STEP 2 and following steps are performed on the post-movement tree. If it is determined in STEP 4 that the subtree does not include a node that can be moved, the routine returns to STEP 2, and a vertex node of another subtree is selected. This processing is performed until it is determined that there is no node that can be moved, with respect to vertex nodes of all subtrees selected in an interim tree created in STEP 1.

However, in NPL 4, it is determined that a node can be moved in STEP 4 of the flow only in a case in which the total number of packets transmitted and received on the sensor tree is reduced as a result of the node being moved. In this case, a problem such as that shown in FIG. 6 occurs and the number of reduced packets achieved in NPL 4 maybe significantly smaller than an ideal number of reduced packets (FIGS. 7 and 8).

Assume that (1) in FIG. 6 shows an interim tree that is created in STEP 1 in FIG. 5. The data aggregation rate S is five, N11 to N13 are nodes of which the hop count from the root node 0 is one, N21 to N23 are nodes of which the hop count from the root node 0 is two, and N31 to N32 are nodes of which the hop count from the root node 0 is three. Also, as shown in the Figure, d(N11)=5, d(N12)=5, d(N13)=5, d(N21)=6, d(N22)=5, d(N23)=6, d(N31)=1, and d(N32)=1. According to hierarchical relationships on the tree shown by arrows, d(below_N11)=6, d(below_N12)=7, d(below_N13)=6, and d(below_N22)=2. As shown in the Figure, N31 and N32 belong to N22 on the tree, but N31 has an adjacency relationship with N21 and N32 has an adjacency relationship with N23. Also, a numeral shown beside each link on the tree indicates the number of packets transmitted on the link in one data collection cycle. In this example, the data aggregation rate S is 5, and therefore the number of packets transmitted from a node i is (d(below_i)+d(i))/5.

If an interim tree such as that shown in (1) in FIG. 6 is created in STEP 1 in FIG. 5, in the method described in NPL 4, the interim tree does not transition to any of the interim trees shown in (2) and (3) in FIG. 6. This is because in STEP 4 in FIG. 5, it is determined that a node can be moved if the movement of the single node reduces the number of packets on the tree, but the number of packets does not change in both of the trees shown in (2) and (3) in FIG. 6.

However, as shown in FIG. 7, if N31 and N32 are moved from under N22 to under N21 and N23, respectively, as shown in (1) and (2), the number of packets transmitted from N22 to an upper node and the number of packets transmitted from N12 to an upper node are each reduced by one, and consequently the number of packets on the tree is reduced by two. FIG. 8 is a diagram obtained by generalizing FIG. 7 with respect to the MECAT problem. The largest hop count from the root node is three in the trees shown in FIG. 7, but FIG. 8 shows trees having a hop count of k+1. In the Figure, Nk1 denotes a leftmost node among nodes of which the hop count from the root node 0 is k, Nk2 denotes a middle node among the nodes of which the hop count is k, and Nk3 denotes a rightmost node among the nodes of which the hop count is k. Also, it is assumed that if 0<i<k, d(Ni1)=5.

For the same reason as that described about FIG. 6, an interim tree shown in (1) in FIG. 8 cannot be changed using the method described in NPL 4, but ideally, it is desirable to create a tree such as that shown in (2) in FIG. 8 to minimize the number of packets. In the case of (2) in FIG. 8, the number of packets is reduced by k, when compared to that in (1). This is because the number of packets transmitted from each of k middle nodes, i.e., Nk2 to N12, is reduced by one. k=(N−2)/3, in which N represents the number of nodes other than the root node, and k is increased in proportion to N. As described above, the method described in NPL 4 has a problem in that the number of packets cannot be minimized.

Although FIG. 8 is generalization of the problem with respect to the MECAT problem, the same problem also occurs in cases in which there are relay nodes as is the case with the MECAT-RN problem. For example, in a case in which a plurality of relay nodes located between the root node 0 and N(k−1) i (here, i=1, 2, or 3) in (1) in FIG. 8 relay transmission between sensor nodes, nodes on the tree shown in (1) in FIG. 8 cannot be moved using the method described in NPL 4. This is because the total number of packets is not changed by the movement. Therefore, in the MECAT-RN problem as well, the problem described with reference to FIGS. 6 to 8 cannot be solved using the method described in NPL 4.

Also, although S=5 in FIGS. 6 to 8, it can be understood that if the value of S is three or more and d(Nij)=S (here, j=1, 2, or 3) under the condition that 0<i<k, the problem described with reference to FIGS. 6 to 8 occurs in the method described in NPL 4. That is, the same problem occurs for all values of S that are three or more.

The present invention was made in view of the foregoing, and it is an object of the present invention to reduce energy consumption of nodes on a sensor tree by easing conditions for changing the configuration of the sensor tree and increasing patterns of movement of the nodes on the sensor tree.

Means for Solving the Problem

A path selection apparatus according to one aspect of the present invention is a path selection apparatus for selecting a path along which sensor reports stored in packets are transmitted from lower nodes to upper nodes in a sensor tree that is constituted by a plurality of nodes including a plurality of sensor nodes, the path selection apparatus including:

a node moving unit configured to select a first node in the sensor tree, and move a second node to under a third node in the sensor tree if the total number of packets transmitted and received in the sensor tree is reduced as a result of the second node being moved to under the third node, the first node having a child node under the first node, the second node being located under a subtree of which a vertex is the first node, the third node not belonging to the subtree, wherein if nodes under the subtree of which the vertex is the first node do not include a node that reduces the total number of packets as a result of being moved, the node moving unit moves a node that is included in the nodes under the subtree and does not change the total number of packets, to under the third node.

A path selection method according to another aspect of the present invention is a path selection method performed in a path selection apparatus for selecting a path along which sensor reports stored in packets are transmitted from lower nodes to upper nodes in a sensor tree that is constituted by a plurality of nodes including a plurality of sensor nodes, the path selection method including:

selecting a first node in the sensor tree, and moving a second node to under a third node in the sensor tree if the total number of packets transmitted and received in the sensor tree is reduced as a result of the second node being moved to under the third node, the first node having a child node under the first node, the second node being located under a subtree of which a vertex is the first node, the third node not belonging to the subtree; and if nodes under the subtree of which the vertex is the first node do not include a node that reduces the total number of packets as a result of being moved, moving a node that is included in the nodes under the subtree and does not change the total number of packets, to under the third node.

A program according to another aspect of the present invention causes a computer to function as each unit of the above-described path selection apparatus.

Effects of the Invention

According to the present invention, conditions for changing the configuration of a sensor tree are eased and patterns of movement of nodes on the sensor tree are increased to reduce the energy consumption of the nodes on the sensor tree.

BRIEF DESCRIPTION OF DRAWINGS

FIG. 2 is a diagram showing shortest path trees applied to the MECAT problem.

FIG. 7 is a diagram showing an ideal movement result for minimizing the number of packets.

FIG. 8 is a diagram showing an example in which the number of packets is reduced by k when compared to a conventional method.

DESCRIPTION OF EMBODIMENTS

Figure 9:
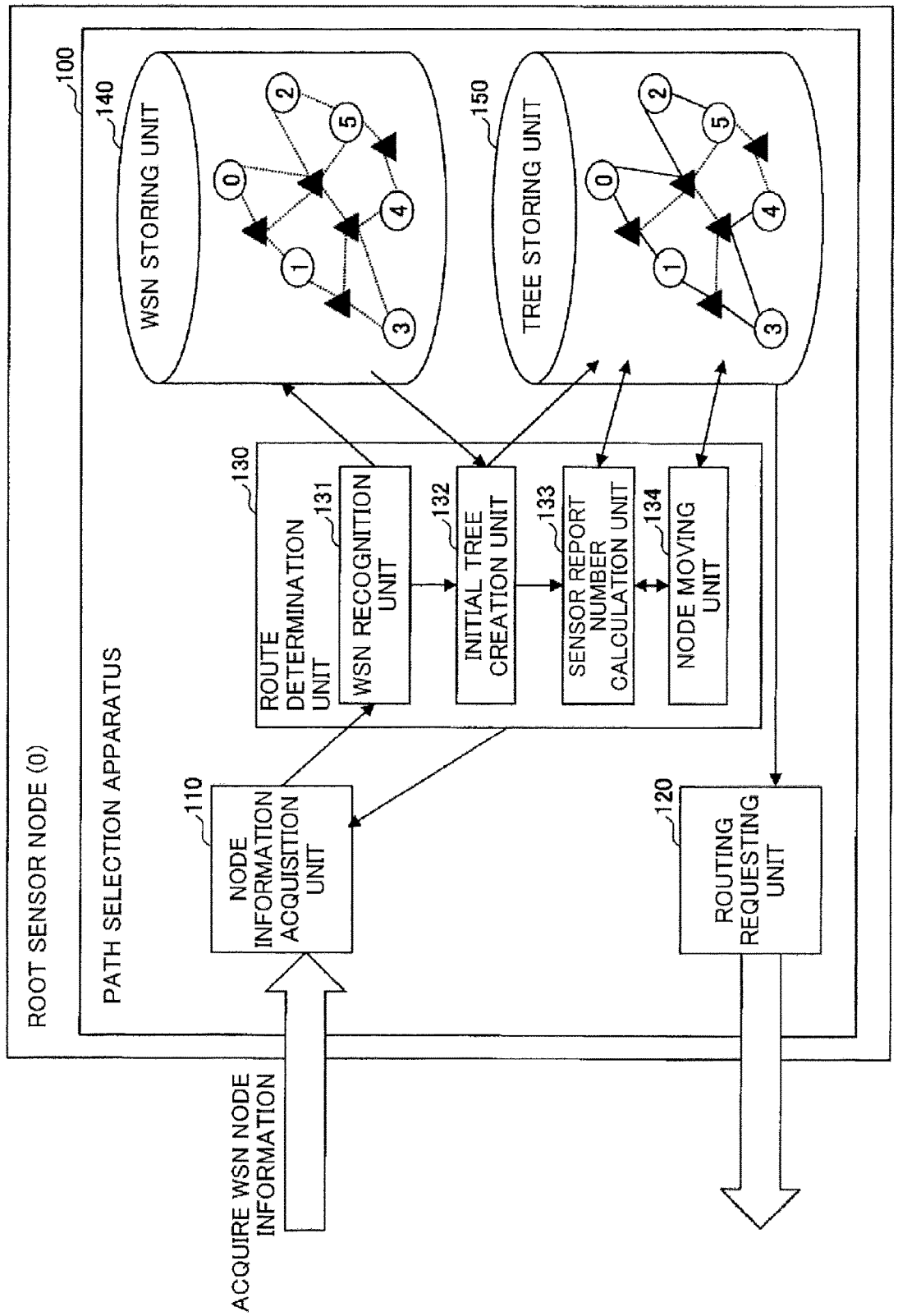
FIG. 9 is a diagram showing an example of a functional configuration of a path selection apparatus in an embodiment of the present invention.

The following describes an embodiment of the present invention based on Figures. FIG. 9 shows an example of a functional configuration of a path selection apparatus 100 in an embodiment of the present invention.

In the present embodiment, a manner of use of a network is assumed in which data collection cycles are repeated in a sensor tree that is constituted by a plurality of nodes (sensor nodes/relay nodes) by transmitting sensor reports stored in packets from lower nodes to upper nodes. The present embodiment can be applied to both a WSN that does not include relay nodes and a WSN that includes relay nodes.

Figure 1:
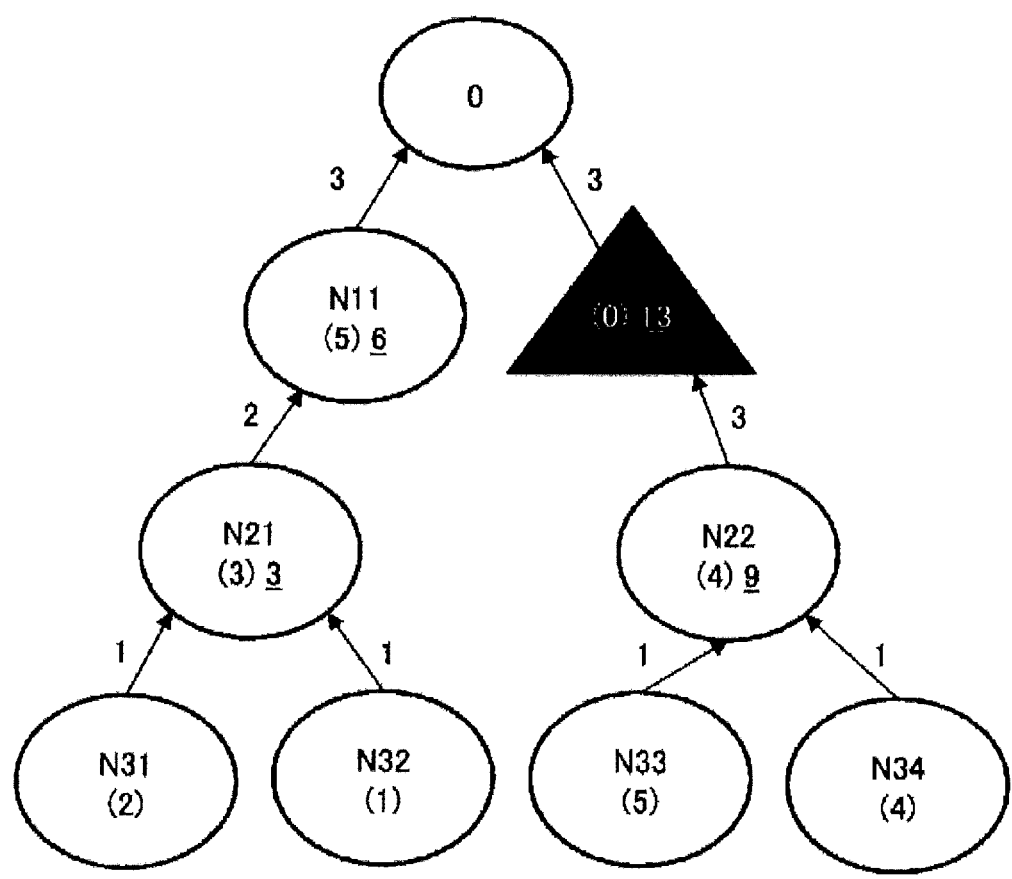
FIG. 1 is a diagram showing an example of the numbers of packets with respect to links on a data collection tree.
Figure 3:
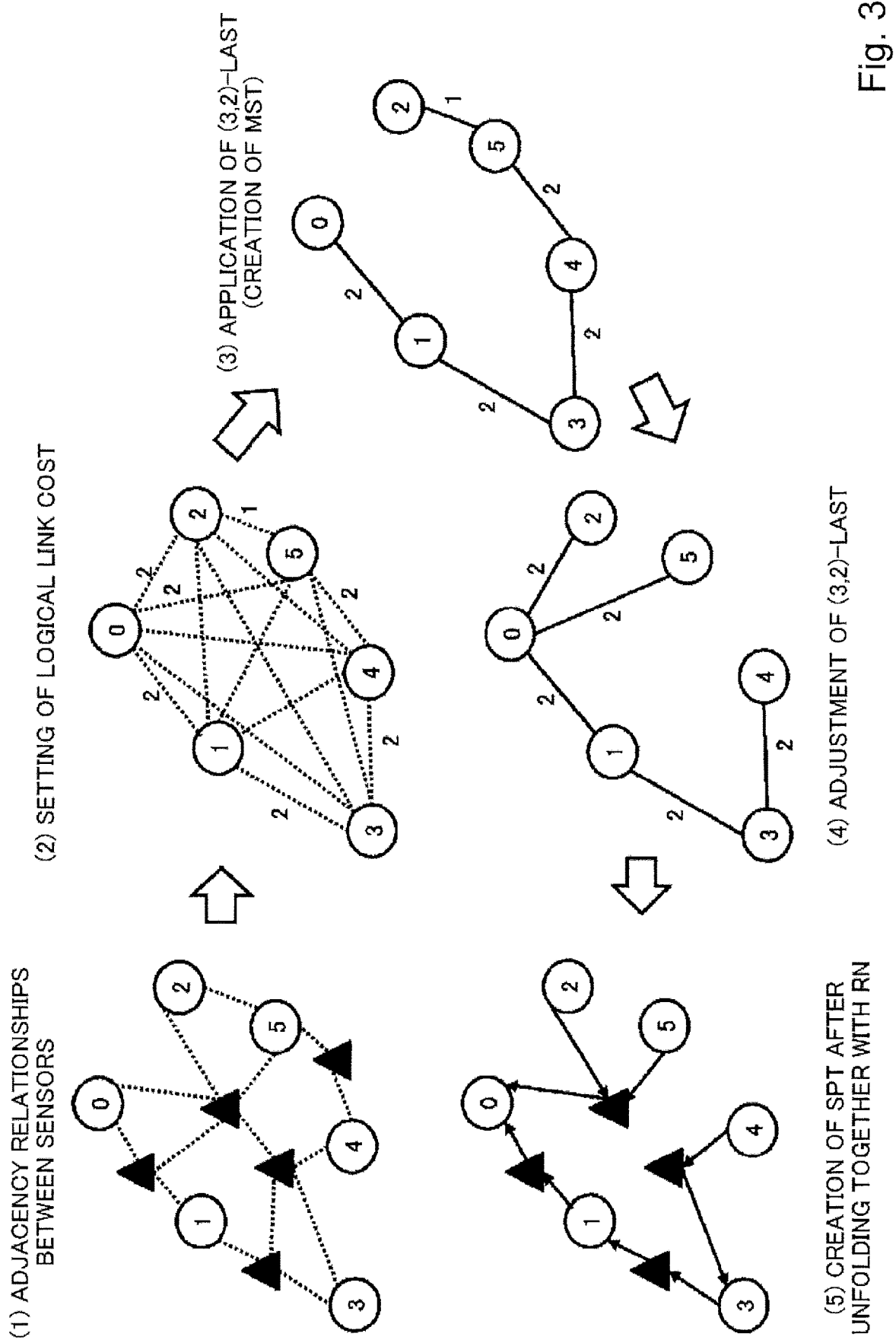
FIG. 3 is a diagram showing an example (example 1) of application of the (3, 2)—LAST algorithm to the MECAT-RN problem.
Figure 4:
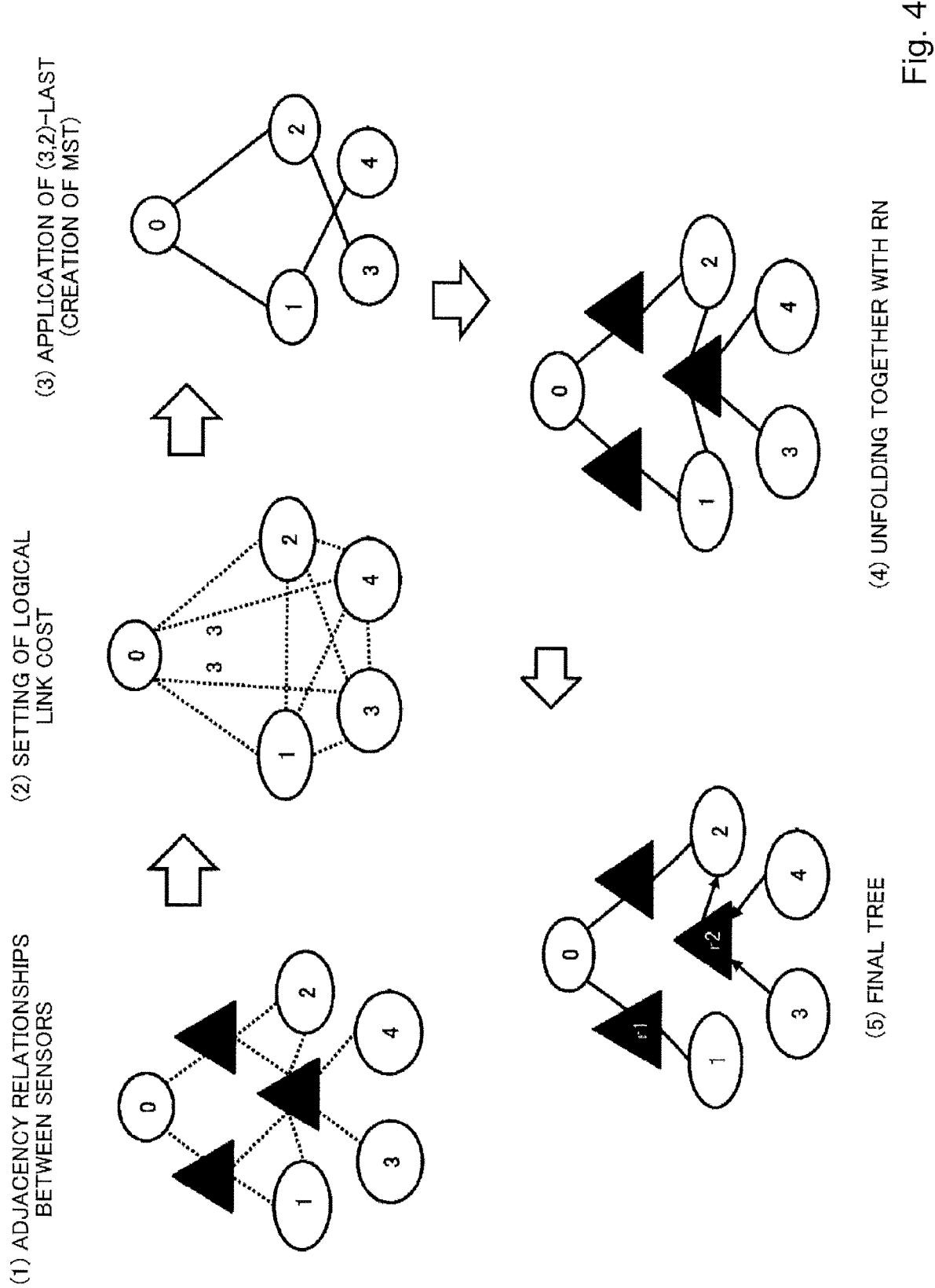
FIG. 4 is a diagram showing an example (example 2) of application of the (3,2)—LAST algorithm to the MECAT-RN problem.

As can be understood from the example shown in FIG. 1, the number of reports transmitted from each node varies between nodes, and energy can be saved by reducing the hop count from a node that has a large number of reports to the root node as far as possible. Also, if the remainder (d(below_i)+d(i)) % S is not zero, there is room in a transmitted and received packet, and therefore, energy can be saved by filling each packet with the maximum number S of sensor reports as far as possible. From these standpoints, the path selection apparatus 100 moves nodes on a sensor tree and selects a path with which the energy consumption can be reduced.

Figure 5:
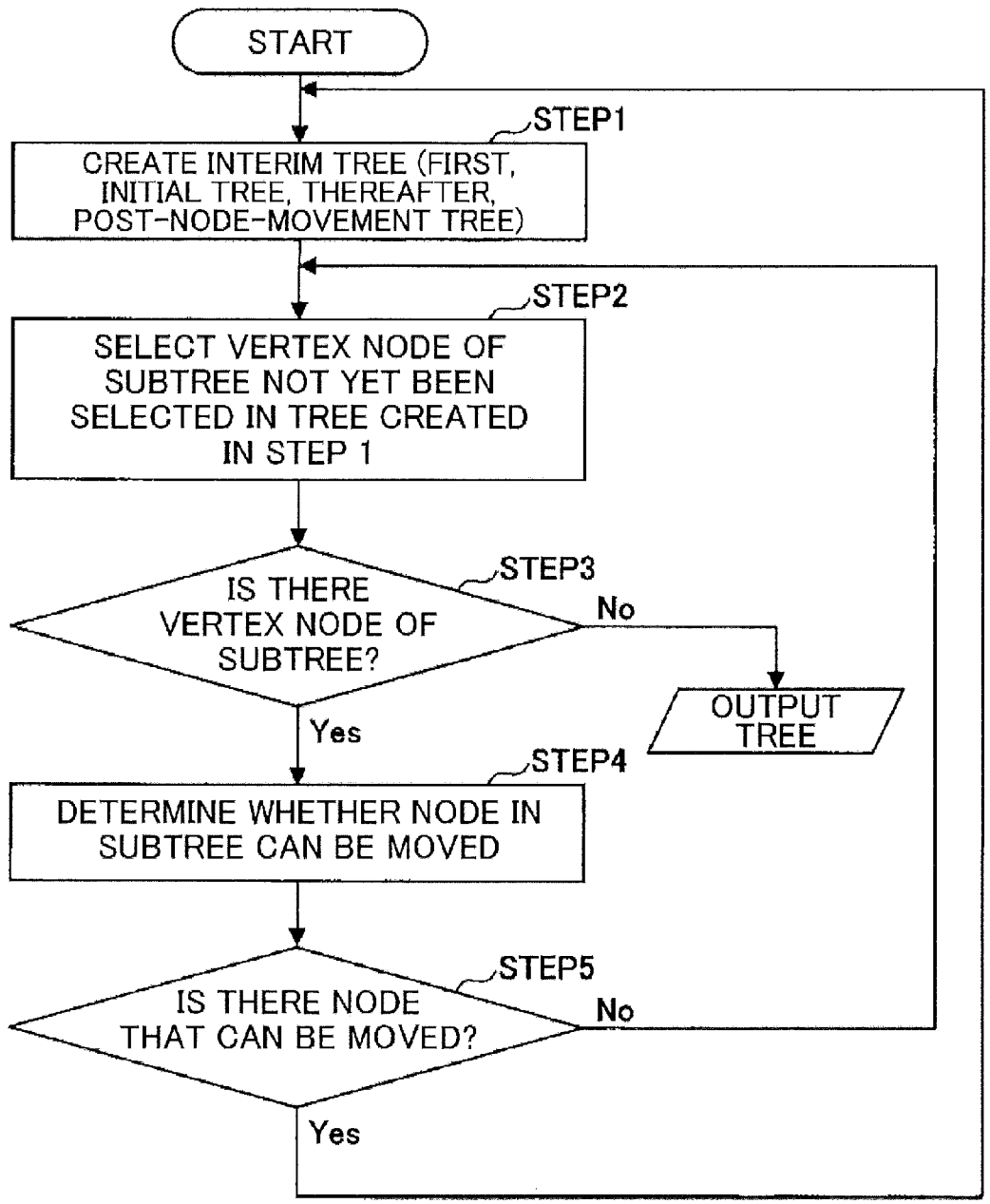
FIG. 5 is a flowchart showing a method for creating a tree in a conventional method.

As shown in FIG. 5, the path selection apparatus 100 is constituted by a node information acquisition unit 110, a routing requesting unit 120, a route determination unit 130, a WSN storing unit 140, and a tree storing unit 150. The route determination unit 130 includes a WSN recognition unit 131, an initial tree creation unit 132, a sensor report number calculation unit 133, and a node moving unit 134. In this example, the path selection apparatus 100 is included in a root node (0), but the path selection apparatus 100 does not necessarily have to be included in the root node, and may also be included in an apparatus, such as a base station, that is connected to the root node, for example.

The node information acquisition unit 110 acquires information regarding nodes that are adjacent to the root node, and acquires information regarding nodes that are adjacent to those nodes. Acquisition of information regarding nodes is repeated in a similar manner, and as a result, adjacency relationships between all nodes that belong to a WSN to which the root node belongs can be acquired.

The WSN recognition unit 131 in the route determination unit 130 can recognize the configuration of the WSN based on the adjacency relationships between the nodes, and as a result, stores the configuration of the WSN in the WSN storing unit 140.

The initial tree creation unit 132 creates an initial tree. In order to create the initial tree, it is possible to consider using a shortest path tree in the MECAT problem and the (3, 2)—LAST algorithm in the MECAT-RN problem, for example. The thus created initial tree is stored in the tree storing unit 150.

The sensor report number calculation unit 133 sets the number d(i) of sensor reports for each node i on the initial tree, and determines the total number d(below_i) of sensor reports from lower nodes that the node i transfers.

The node moving unit 134 repeatedly moves nodes on the sensor tree so that the total number of packets transmitted and received on the sensor tree will be finally reduced. The node moving unit 134 stores a tree that is obtained by moving nodes, in the tree storing unit 150.

The configuration of a finally created tree is reflected to a tree on the actual WSN as a result of the routing requesting unit 120 performing setting of routing with respect to each node.

Figure 10:
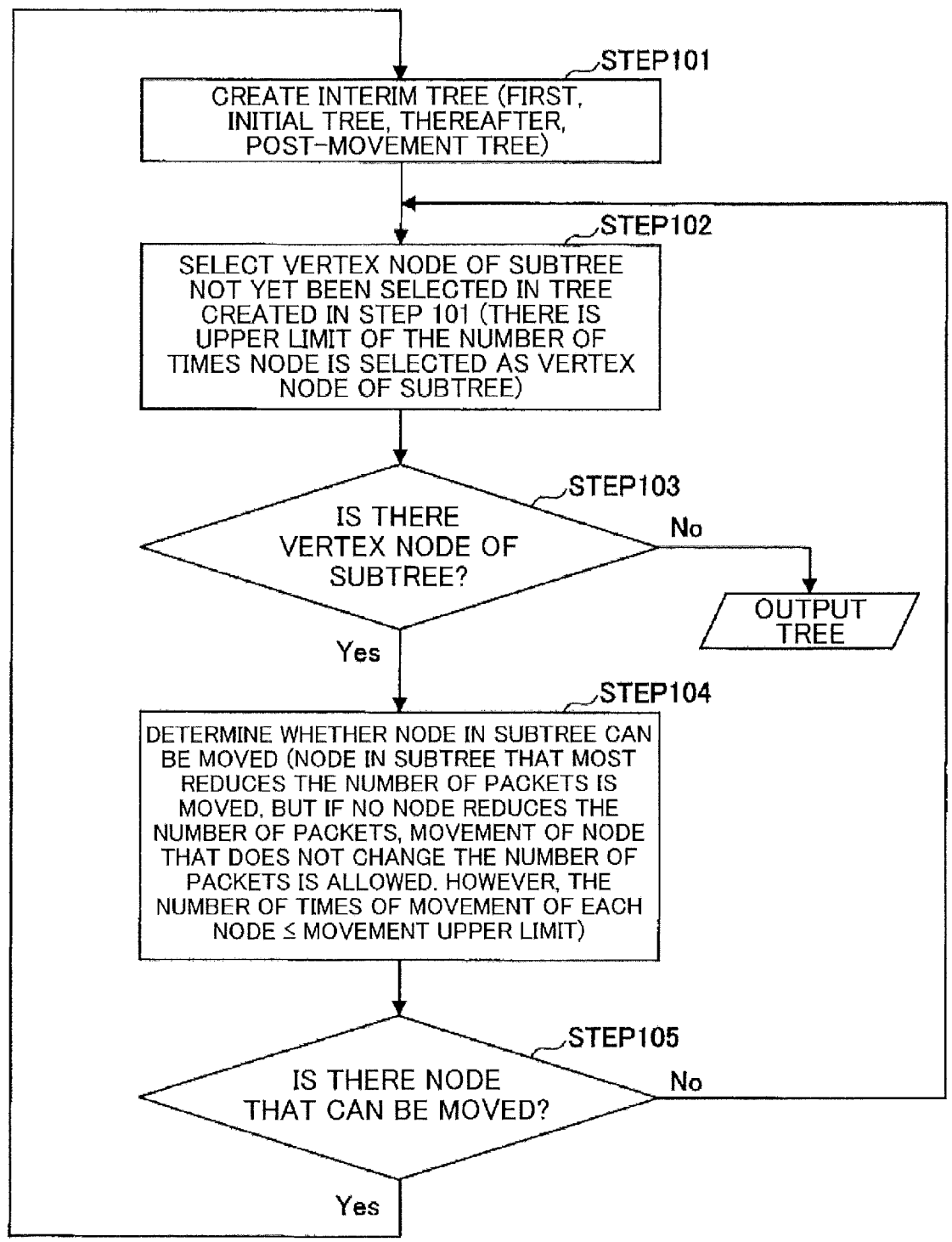
FIG. 10 is a flowchart showing operation of the path selection apparatus in an embodiment of the present invention.

Next, a flowchart shown in FIG. 10 will be described. FIG. 10 is a flowchart showing operation of the path selection apparatus 100 in an embodiment of the present invention.

STEP 101 is initially a step in which the initial tree creation unit 132 creates an initial tree. The initial tree is created using an existing method, such as the shortest path tree in the MECAT problem or the (3, 2)—LAST in the MECAT-RN. Thereafter, if it is determined to move one node from a subtree to another subtree in STEP 104 and STEP 105, which will be described below, STEP 101 is a step in which the node moving unit 134 creates a tree that is obtained by moving the node. With respect to each node i on the initial tree, the sensor report number calculation unit 133 sets the number d(i) of reports created by the node i and the total number d(below_i) of sensor reports from lower nodes that the node i transfers. Also, if there is a change in the total number d (below_i) of sensor reports from lower nodes that the node i transfers in a tree obtained by moving a node, the sensor report number calculation unit again sets d(below_i).

The following STEP 102 to STEP 105 are steps that are executed by the node moving unit 134.

In STEP 102, a vertex node of a movement target subtree is determined in the tree created in STEP 101. Conditions for the determination are that the vertex node is not a leaf node on the tree and has at least one child node. Also, a node that has not yet been selected in a loop between STEP 102 and STEP 105 after an interim tree has been created in STEP 101 is selected. However, if the number of times a node has already been selected as a vertex node of a subtree has reached the maximum number of times the node can be selected as a vertex node of a subtree, the node will not be selected as a vertex node of a subtree more than the maximum number of times.

In STEP 103, whether or not a vertex node of a subtree can be selected in STEP 102 is determined. If a vertex node cannot be selected (No), a tree that has been created by that point in time is taken to be a final output tree, and the processing ends. If a vertex node of a subtree can be selected, the routine proceeds to processing in STEP 4.

In STEP 104, it is determined whether or not nodes (except the vertex node) under the vertex node of the subtree include a node that reduces the total number of packets transmitted and received on the tree, as a result of the node being moved. A condition for the determination is that a parent node of the destination of the movement does not belong to the subtree. Here, a node that most reduces the number of packets as a result of being moved is moved to under a node other than the subtree, to increase an effect of reducing the energy consumption. However, if examination of all nodes under the subtree revealed that the number of packets cannot be reduced by moving any of the nodes under the subtree, a node that does not change the number of packets even if the node is moved is moved. However, a node that has already been moved the maximum number of times will not be moved.

If it is determined in STEP 104 that there is a node that can be moved (Yes), the routine proceeds from STEP 105 to processing in STEP 101, and the node is moved to under a movement destination node to create a post-movement tree. If it is determined that there is no node that can be moved under the subtree (No), the routine proceeds to STEP 102 and a vertex node of another subtree is searched for.

Note that the upper limit of the number of times of movement referred to in STEP 104 may be the upper limit of the number of times of movement for a node that does not change the total number of packets even if the node is moved. Either of the upper limit of the number of times of movement referred to in STEP 104 and the upper limit of the number of times each node can be selected as a vertex node of a subtree, which is referred to in STEP 102, is necessary in the present embodiment. This is because unless either of these restrictions is imposed, movement of a node that does not change the total number of packets may be looped (movement of the node between two parent nodes may be infinitely repeated), and in such a case, the flowchart shown in FIG. 10 will not end.

<Example of Application to MECAT Problem>

Figure 11:
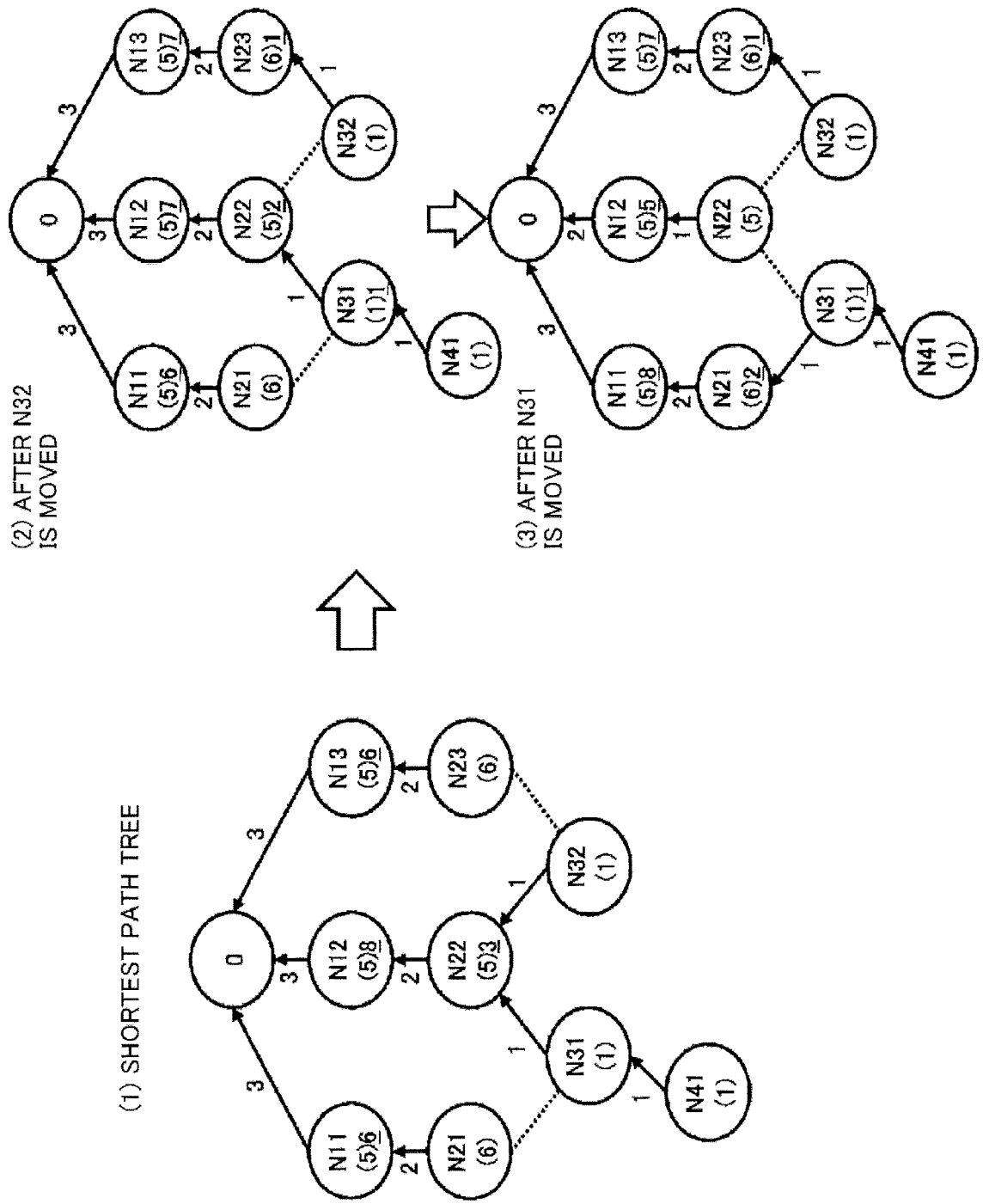
FIG. 11 shows an example of movement of nodes when an embodiment of the present invention is applied to the MECAT problem.

FIG. 11 shows an example of movement of nodes when the present embodiment is applied to the MECAT problem. In this example, a shortest path tree is already created as shown in (1) in FIG. 11. In FIG. 11, "a" shown in parentheses such as (a) in each tree node indicates the number d(i) of sensor reports created by a node i in one data collection cycle, and underlined "b" shown beside (a) indicates the total number d(below_i) of sensor reports from all lower nodes that the node i transfers. Solid line arrows show adjacency relationships between tree nodes, and sensor reports are transferred from lower nodes to upper nodes along the solid lines, and finally transmitted to a root node 0. Dotted lines show adjacency relationships between nodes, which are not used in the tree. A numeral shown beside each link indicates the number of packets transmitted on the link, and the data aggregation rate S is five.

On the shortest path tree of this example shown in (1) in FIG. 11, which is an initial tree, N11, N12, N13, N22, and. N31 are nodes that have child nodes, and accordingly, one of these nodes is selected as a vertex node of a subtree. In this example, even if N31 is selected as a vertex node of a subtree, no node under N31 can be moved. This is because N41 under N31 does not have an adjacency relationship other than a link on the tree.

If N11 is selected as a vertex of a subtree, moving N21 to under N31 is considered in STEP 104 in FIG. 10. In this case, the number of packets is increased by one on each of the links between N31 and N22, N22 and N12, and N12 and 0, while the number of packets is reduced by two between N11 and 0. Accordingly, the total number of packets is increased by one. If the number of packets is increased as described above, the node is not moved. If N13 is selected as a vertex of a subtree, the number of packets is increased by one as a result of N23 being moved to under N32, and therefore the node is not moved.

If N12 or N22 is selected as a vertex of a subtree, N31 and N32 under these nodes are considered as targets of movement. This is because N31 has an adjacency relationship with N21 and N32 has an adjacency relationship with N23. Although the number of packets does not change as a result of either of N31 and N32 being moved, it is determined that N31 and N32 can be moved, in STEP 104 in FIG. 10. In this case, either of these nodes is moved, and in (2) in FIG. 11 of this example, it is assumed that N32 has been moved.

Here, a vertex node of a subtree in the post-movement tree shown in (2) in FIG. 11 is selected by returning to STEP 101 in FIG. 10 again. Here, if N13 or N23 is selected by chance, N32 returns to under N22, but if N12 or N22 is selected, N31 moves from under N22 to under N21. This is because as a result of this movement, the number of packets is reduced by one on each of the links between N22 and N12, and N12 and 0, and consequently the total number of packets is reduced by two, as shown in (3) in FIG. 11. Note that it is effective to determine an upper limit value of the number of times of movement of each node to prevent a loop in which N13 or N23 is selected as a vertex node of a subtree in (2) in FIG. 11, N32 returns to under N22, and N32 is repeatedly moved under N22 and N23.

The tree shown in (3) in FIG. 11 is taken to be an output tree. This is because even if N11 or N21 is selected as a vertex node of a subtree, the number of packets is increased by two if N31 is moved from under N21 to under N22 (returns to the state shown in (2) in FIG. 11). For the same reason, N32 is not moved even if N13 or N23 is selected as a vertex node of a subtree.

<Example of Application to MECAT-RN Problem>

Figure 12:
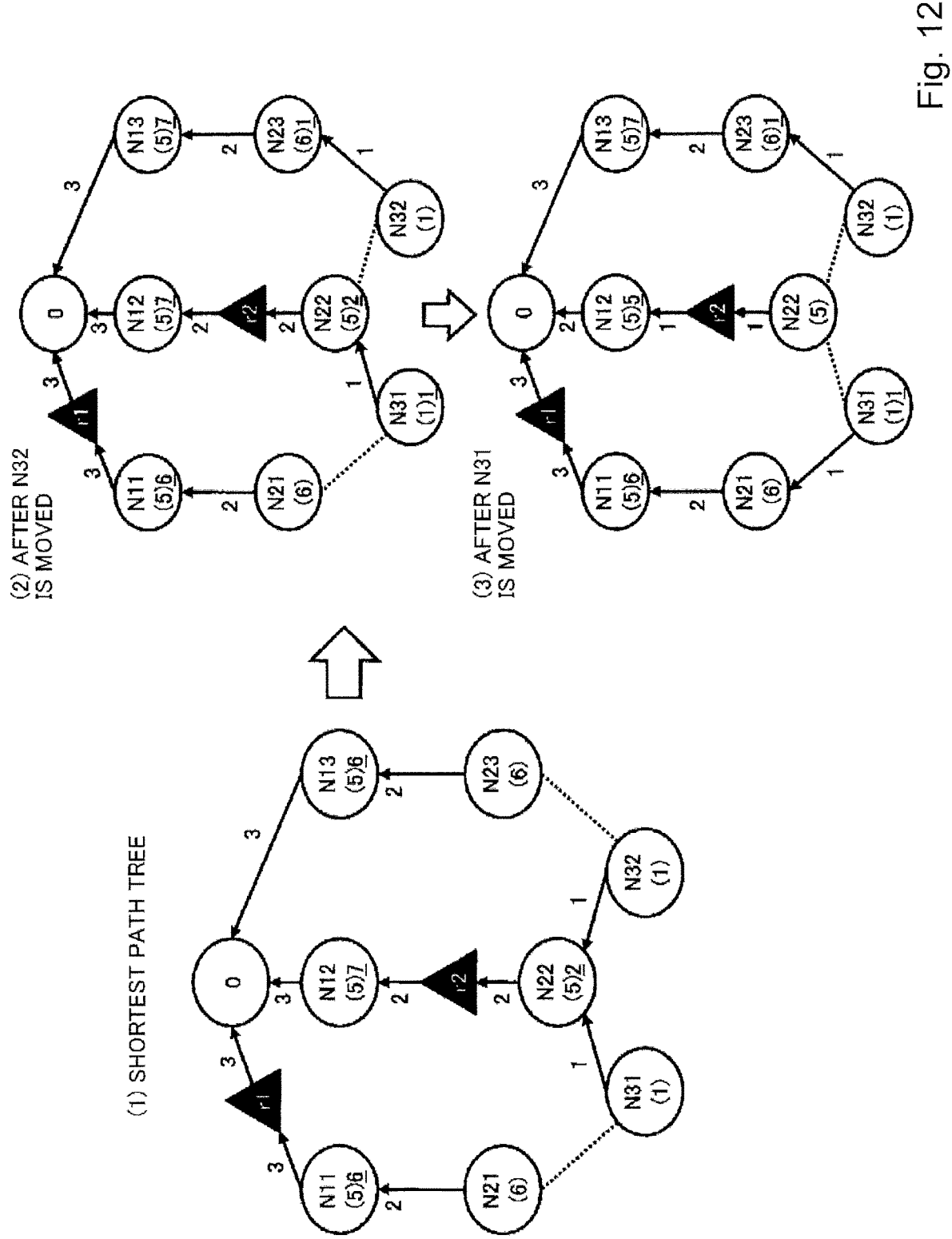
FIG. 12 shows an example of movement of nodes when an embodiment of the present invention is applied to the MECAT-RN problem.

FIG. 12 shows an example of movement of nodes when the present embodiment is applied to the MECAT-RN problem. In this example, a tree that includes relay nodes is already created using the (3,2)—LAST algorithm as shown in (1) in FIG. 12. In FIG. 12, r1 and r2 represent relay nodes and other nodes represent sensor nodes. Solid line arrows show adjacency relationships between tree nodes, and sensor reports are transferred from lower nodes to upper nodes along the solid lines, and finally transmitted to a root node 0. Dotted lines show adjacency relationships between nodes, which are not used in the tree. A numeral shown beside each link indicates the number of packets transmitted on the link, and the data aggregation rate S is five.

(1) in FIG. 12 shows a case in which any of N12, r2, and N22 is selected as a vertex node of a subtree in STEP 102 in FIG. 10, but even if another node (r1, N11, or N13) is selected as a vertex node, node under the selected node is not moved. This is because the number of packets on the tree is increased in both of a case in which N21 is moved to under N31 and a case in which N23 is moved to under N32. If any of N12, r2, and N22 is selected as a vertex node, moving N31 from under N22 to under N21 or moving N32 from under N22 to under N23 is considered in STEP 104 in FIG. 10. In both cases, the number of packets does not change between before and after the movement, and therefore either of N31 and N32 is selected to be moved. In (2) in FIG. 12, it is assumed that N32 has been moved to under N23 in STEP 101 in FIG. 10.

In the tree shown in (2) in FIG. 12, it is assumed that any of N12, r2, and N22 is selected again as a vertex node of a subtree in STEP 102 in FIG. 10, but if N13 or N23 is selected, N32 returns to under N22. To avoid such a loop of movement, it is effective to set an upper limit value of the number of times of movement.

In (2) in FIG. 12, moving N31 from under N22 to under N21 is considered, and N31 is moved to under N21 because as a result of this movement, the number of packets is reduced by one on each of the links between N22 and r2, r2 and N12, and N12 and 0 and a total of three packets are reduced, as shown in (3) in FIG. 12.

The tree shown in (3) in FIG. 12 is taken to be an output tree. This is because even if N11 or N21 is selected as a vertex node of a subtree, the number of packets is increased by three if N31 is moved from under N21 to under N22 (returns to the state shown in (2) in FIG. 12). For the same reason, N32 is not moved even if N13 or N23 is selected as a vertex node of a subtree.

<Effects of Embodiment of the Invention>

As described above, according to the present embodiment, even in cases such as those described with reference to FIGS. 6 to 8, the number of packets transmitted on the sensor tree can be reduced as a result of patterns of movement of nodes on the sensor tree being increased, and the energy consumption on the sensor tree can be reduced.

Figure 6:
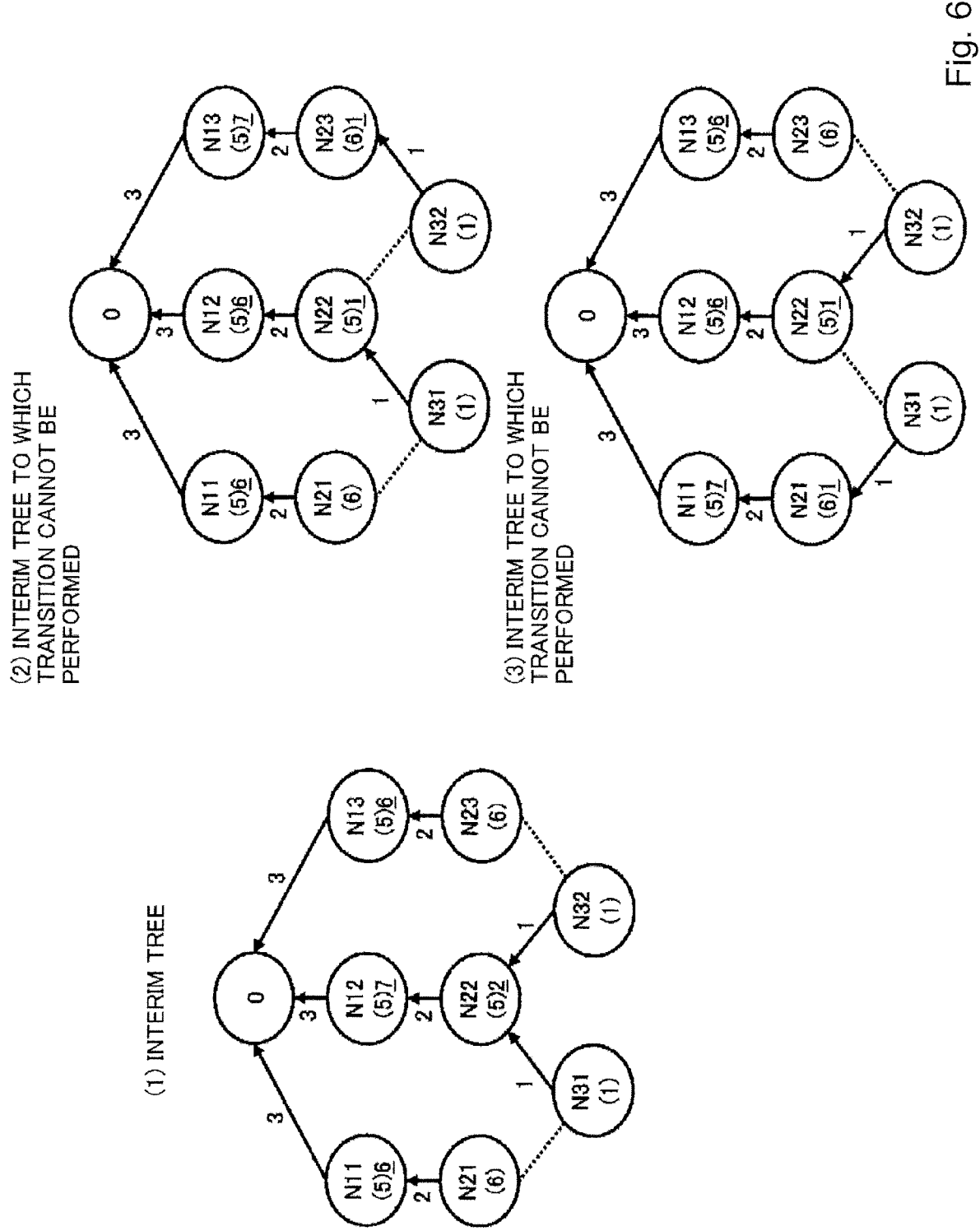
FIG. 6 is a diagram showing a problem that occurs in a conventional method.

For example, in FIG. 6, transition from (1) to (2) or (3) can be realized according to the present embodiment, although this cannot be realized using the method described in NPL 4. In a case in which the interim tree shown in (2) in FIG. 6 is created, if N22 or N12 is selected next as a vertex node of a subtree in STEP 102 in FIG. 10, N31 will be moved from under N22 to under N21, and the ideal movement shown in FIG. 7 will be realized. Also, in a case in which the interim tree shown in (3) in FIG. 6 created, if N22 or N12 is selected next as a vertex node of a subtree in STEP 102 in FIG. 10, N32 will be moved from under N22 to under N23, and the ideal movement shown in FIG. 7 will be realized. As described above, the possibility that an interim tree such as that shown in (2) or (3) in FIG. 6, which cannot be realized in the method described in NPL 4, is created in STEP 101 in FIG. 10 is increased, and therefore, the possibility that an ideal tree for minimizing the number of packets on the tree, such as that shown in FIG. 7 or 8, is created is increased.

Figure 13:
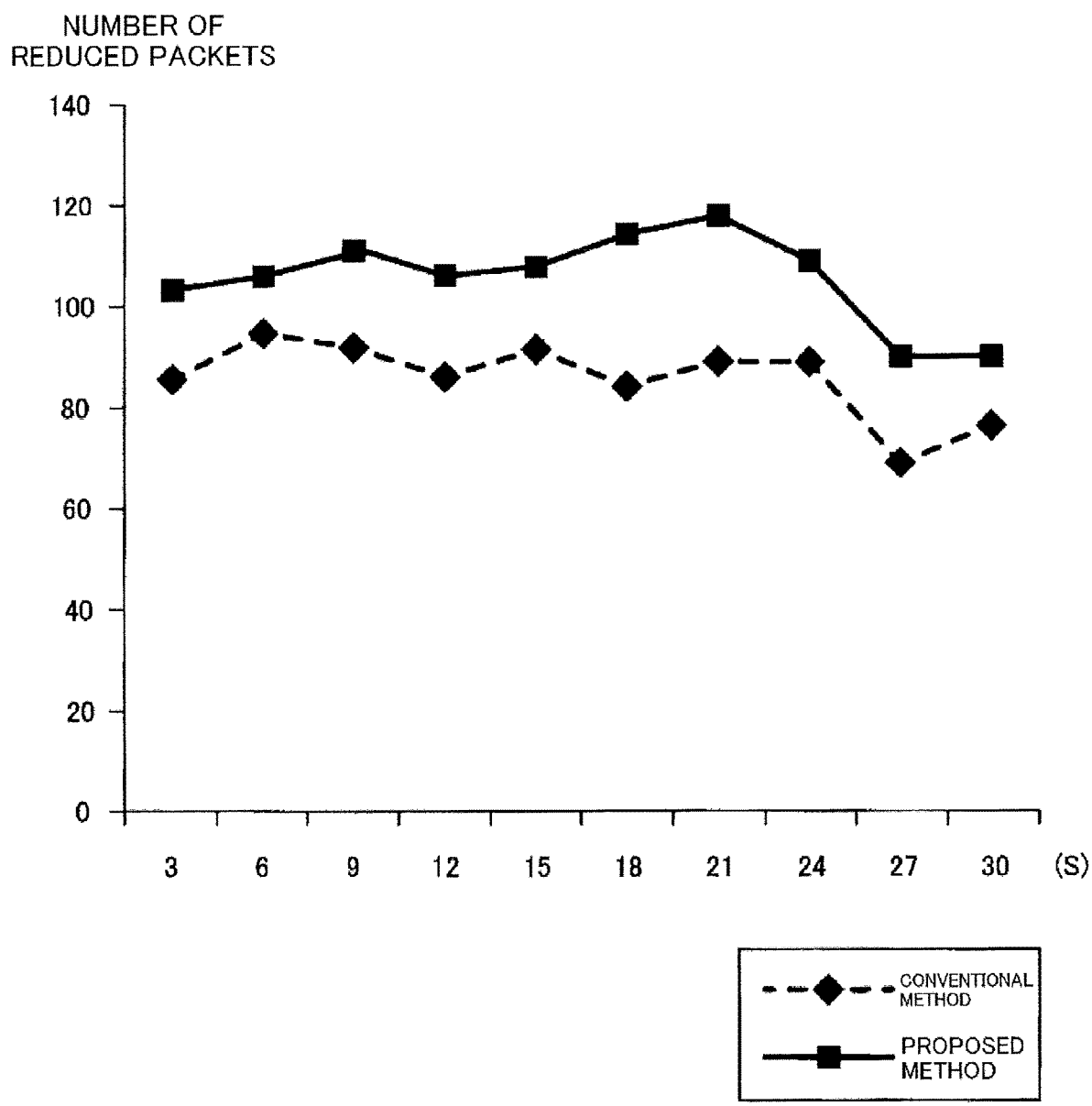
FIG. 13 is a diagram showing an effect of reducing the number of packets relative to that in a conventional method.
Figure 14:
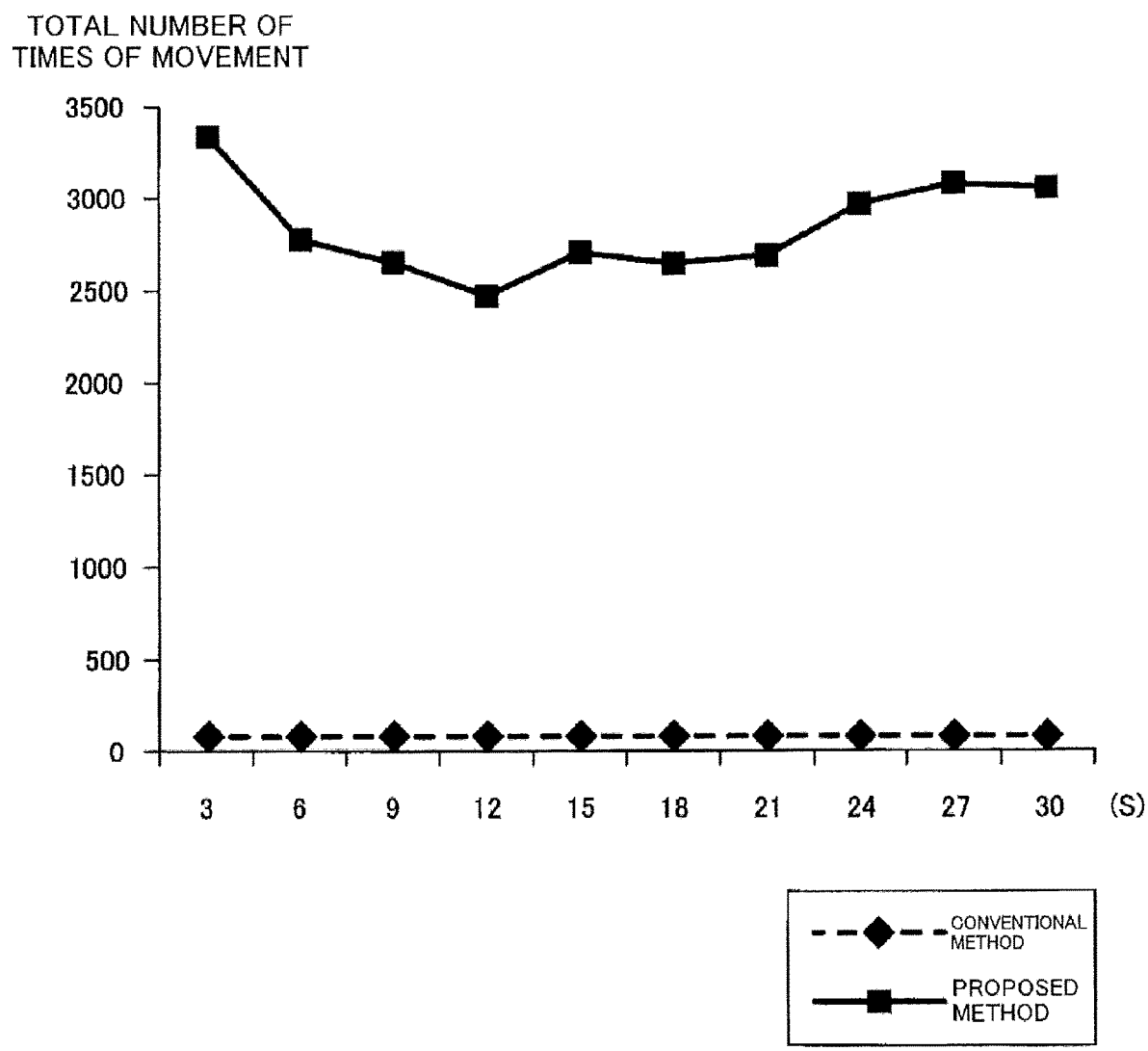
FIG. 14 is a diagram showing increase in the total number of times of movement relative to that in a conventional method.
Figure 15:
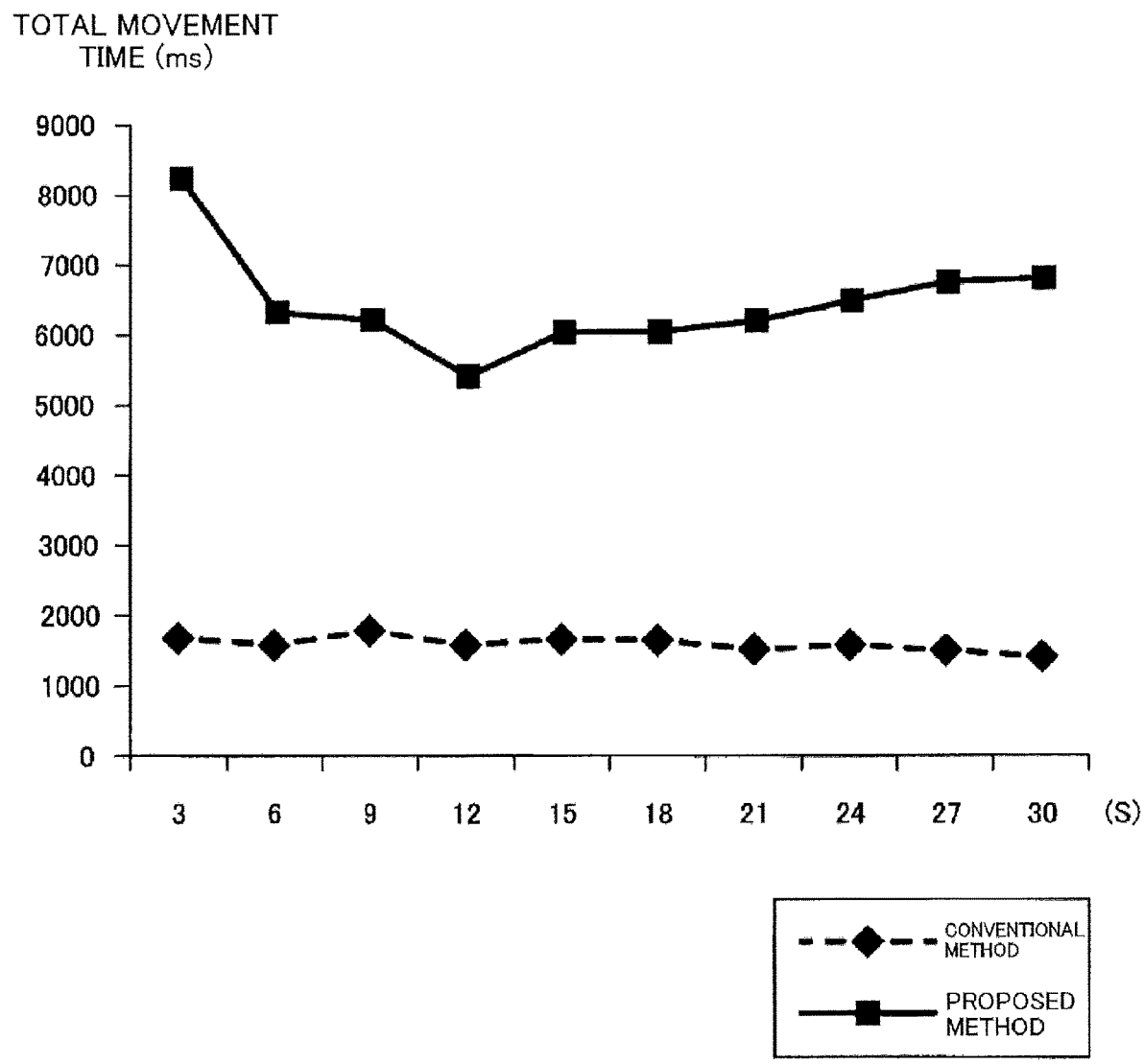
FIG. 15 is a diagram showing a result of comparison with a conventional method regarding the total movement time.

FIGS. 13 to 15 show results of simulation of an effect of reducing the number of packets and a processing load according to the present embodiment.

Thousand sensor nodes were randomly arranged on a 400 m×400 m plane in a computer simulation environment, while setting the shortest distance between two different sensors to 10 m, and then adjacency relationships were created between sensor nodes located within a transmission distance of sensor signals, which was 25 m. As a result, adjacency relationships with an average of about 11.3 nodes were created per sensor node. Results obtained by creating a shortest path tree (initial tree) through breath first search and then applying the present embodiment to the initial tree in this environment are shown.

Evaluation was performed under conditions where uniform random numbers from 1 to 5 were set as the numbers of sensor reports of respective sensors. FIG. 13 shows comparison between a conventional method (NPL 4) and a proposed method (the present embodiment) in terms of the number of packets reduced from the initial tree. The horizontal axis of the graph indicates the data aggregation rate (S). The maximum number of times each node was selected as a vertex node of a subtree was 10, and the maximum number of times of movement of each node was 10. That is, the only difference between the proposed method and the conventional method was in that, if nodes under a vertex node of a selected subtree included only nodes that did not have the effect of reducing the number of packets, whether or not to move those nodes up to the upper limit of the number of times of movement.

FIG. 13 shows the number of packets reduced from the total number of packets in one data collection cycle with respect to shortest path trees that were respectively obtained by moving nodes using the conventional method and the proposed method. At all data aggregation rates (S), the number of reduced packets was increased by 12% to 36% by the proposed method, when compared to the conventional method.

On the other hand, in the proposed method, even if the number of packets is not reduced as a result of a node being moved once, the node is moved up to the upper limit of the number of times of movement, and therefore nodes are moved many times until the flow shown in FIG. 10 ends. In order to evaluate a load of such movement, FIG. 14 shows the total number of times of movement with respect to the proposed method and the conventional method. An average number of times of movement was 68 in the conventional method for all values of S, but the proposed method required an average of 2821 times of movement. However, from comparison of the total movement time shown in FIG. 15, it can be found that an average total time that movement in the proposed method took was 6.4 seconds, and when compared to an average of 1.6 seconds in the conventional method, an average overhead was only 4.8 seconds.

Usually, a tree need not be created in real time and the frequency of creation of trees is not high, and therefore the overhead of about 5 seconds will not be a big problem.

<Example of Hardware Configuration>

Figure 16:
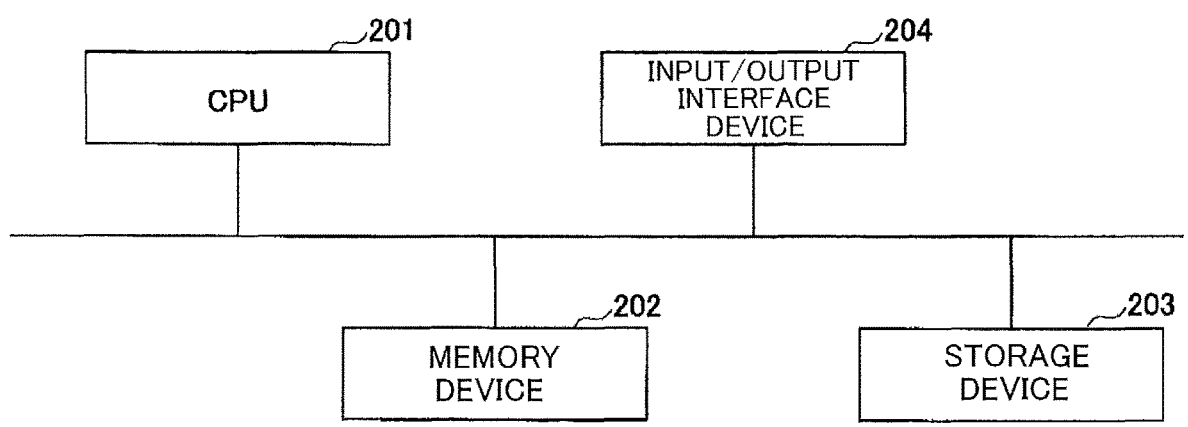
FIG. 16 is a diagram showing an example of a hardware configuration of the path selection apparatus in an embodiment of the present invention.

FIG. 16 shows an example of a hardware configuration of the path selection apparatus 100 in an embodiment of the present invention. The path selection apparatus 100 may also be a computer that is constituted by a processor such as a CPU (Central Processing Unit) 201, a memory device 202 such as a RAM (Random Access Memory) or ROM (Read Only Memory), a storage device 203 such as a hard disk, and the like. For example, functions and processing of the path selection apparatus 100 are realized as a result of the CPU 201 executing data or programs stored in the storage device 203 or the memory device 202. Also, information necessary for the path selection apparatus 100 may also be input from an input/output interface device 204, and results obtained by the path selection apparatus 100 may also be output from the input/output interface device 204.

<Supplementary Notes>

The path selection apparatus according to an embodiment of the present invention is described using a functional block diagram for the sake of convenience of description, but the path selection apparatus according to an embodiment of the present invention may also be realized by hardware, software, or a combination of hardware and software. For example, an embodiment of the present invention may also be realized by a program that causes a computer to realize functions of the path selection apparatus according to an embodiment of the present invention, a program that causes a computer to execute each step of a method according to an embodiment of the present invention, and the like. Also, functional units may also be used in combination as necessary. Also, a method according to an embodiment of the present invention may also be performed in order differing from that described in the embodiment.

Although a method for reducing the energy consumption of nodes on a sensor tree has been described, the present invention is not limited to the above-described embodiment, and various changes and applications can be made within the scope of the claims.

REFERENCE SIGNS LIST

100 Path selection apparatus
110 Node information acquisition unit
120 Routing requesting unit
130 Route determination unit
131 WSN recognition unit
132 Initial tree creation unit
133 Sensor report number calculation unit
134 Node moving unit
140 WSN Storing unit
150 Tree storing unit
201 CPU
202 Memory device
203 Storage device
204 Input/output interface device

The invention claimed is:

1. A path selection apparatus for selecting a path along which sensor reports stored in packets are transmitted from lower nodes to upper nodes in a sensor tree that is constituted by a plurality of nodes including a plurality of sensor nodes, the path selection apparatus comprising:
a processor;
a memory device storing a program that causes the processor to
select a first node in the sensor tree,
move a second node to under a third node in the sensor tree if a total number of packets transmitted and received in the sensor tree is reduced as a result of the second node being moved to under the third node, the first node having a child node under the first node, the second node being located under a subtree of which a vertex is the first node, the third node not belonging to the subtree, and
if nodes under the subtree of which the vertex is the first node do not include a node that reduces the total number of packets as a result of being moved, determine whether the nodes under the subtree includes a node that meets a condition, said condition including moving the node does not change the total number of packets, and move the node to under the third node upon determining that the node meets the condition.

2. The path selection apparatus according to claim 1, wherein the processor determines a change in the total number of packets as a result of movement of a node, with respect to each node under the subtree of which the vertex is the first node, and moves a node that most reduces the total number of packets.

3. The path selection apparatus according to claim 1, wherein if nodes are repeatedly moved in the sensor tree, the processor sets an upper limit of the number of times each node is selected as a vertex node of a subtree.

4. The path selection apparatus according to claim 3, wherein if nodes are repeatedly moved in the sensor tree, the processor sets an upper limit of the number of times each node is moved and an upper limit of the number of times a node that does not change the total number of packets is moved.

5. The path selection apparatus according to claim 1, wherein if nodes are repeatedly moved in the sensor tree, the processor sets an upper limit of the number of times each node is moved.

6. The path selection apparatus according to claim 1, wherein if nodes are repeatedly moved in the sensor tree, the processor sets an upper limit of the number of times a node that does not change the total number of packets is moved.

7. A non-transitory computer-readable recording medium storing a program for causing a computer to function as the path selection apparatus according to claim 1.

8. The path selection apparatus according to claim 1, wherein the processor examines all of the nodes under the subtree of which the vertex is the first node and determines whether any one of the nodes under the subtree reduces the total number of packets as a result of being moved before determining whether the nodes under the subtree includes the node that meets the condition.

9. A path selection method performed in a path selection apparatus for selecting a path along which sensor reports stored in packets are transmitted from lower nodes to upper nodes in a sensor tree that is constituted by a plurality of nodes including a plurality of sensor nodes, the path selection method comprising:

selecting a first node in the sensor tree;
moving a second node to under a third node in the sensor tree if a total number of packets transmitted and received in the sensor tree is reduced as a result of the second node being moved to under the third node, the first node having a child node under the first node, the second node being located under a subtree of which a vertex is the first node, the third node not belonging to the subtree; and
if nodes under the subtree of which the vertex is the first node do not include a node that reduces the total number of packets as a result of being moved, determining whether the nodes under the subtree includes a node that meets a condition, said condition including moving the node does not change the total number of packets, and moving the node to under the third node upon determining that the node meets the condition.

\* \* \* \* \*